United States Patent [19]

Rhoads

[11] 4,067,762
[45] Jan. 10, 1978

[54] PORTABLE EDGE BANDER
[75] Inventor: Randall D. Rhoads, Lititz, Pa.
[73] Assignee: Yerger Bros. Inc., Lititz, Pa.
[21] Appl. No.: 768,787
[22] Filed: Feb. 15, 1977
[51] Int. Cl.² .......................... B32B 31/00; B44C 7/00
[52] U.S. Cl. .................................... 156/250; 156/499; 156/523; 156/577
[58] Field of Search .............. 156/250, 523, 574, 577, 156/579, 499

[56] References Cited
U.S. PATENT DOCUMENTS

| | | | |
|---|---|---|---|
| 2,192,634 | 3/1940 | Blomquist | 156/523 |
| 2,709,742 | 5/1955 | Perry | 156/574 |
| 3,740,297 | 6/1973 | Vidinsky | 156/523 |
| 3,962,016 | 6/1976 | Alfter et al. | 156/499 |
| 3,968,001 | 7/1976 | Lockwood | 156/579 |

Primary Examiner—Douglas J. Drummond
Attorney, Agent, or Firm—Martin Fruitman

[57] ABSTRACT

A portable edge bander for bonding polyester, vinyl or wood veneer trim edging to profile contours. A hand held device including a thermostatically controlled electric heater and a supply of tape-like trim. The tape is preheated by the heater as the operator moves the machine along the edge of the material to be covered. A triggered cutter cuts the tape automatically after the completion of the operation. The size of the apparatus is minimized by storing the tape above the working surface and transporting it by a series of rollers to the under side of a plate from which it is bonded onto the working surface.

13 Claims, 2 Drawing Figures

PORTABLE EDGE BANDER

BACKGROUND OF THE INVENTION

This invention relates generally to adhesive bonding and more specifically to a method and apparatus for bonding a tape to the complex contour of a surface edge by heating the tape and carrying the supply of tape along with the heater.

While many devices exist for edge banding of laminates to various surfaces, all the present art is based on a fixed apparatus mounted upon a table or other work surface upon which the item to be edge banded is placed. The work is then moved along the work surface of the table and rotated as corners of the surface are covered until finally the work is covered over the entire edge that is desired. Such methods are reasonably satisfactory for small items such as shelves of limited length, but as the surface to be banded increases in size, or the contours become complex, it becomes more and more difficult to handle on the table-like arrangement. Edge banding of 4 foot by 8 foot sheet material, for instance, requires 2 or 3 men to stabilize the surface while it is being banded. The weight of the surface to be edge banded is also a critical factor since in the previous methods the surface must be moved continuously and at a reasonably fixed rate of speed along the edge banding apparatus. Pressure must also be maintained against a heating element or roller in order to create the proper bond. It is apparent that as panels become larger and heavier, ultimately a limit is reached which simply prevents edge banding due to size and weight.

The present invention overcomes the limitation of size and weight by moving the edge banding apparatus while permitting the surface to remain stationary. No movement of large or heavy panels is required. There is virtually no limit as to the size of a panel that may be edge banded. Moreover, since it is the edge banding apparatus and tape that move, the present invention can be used to edge band items that are fixed into place in their final position.

SUMMARY OF THE INVENTION

The invention is an apparatus and method for continuously bonding trim tape to the edge of any surface. It can be used to edge band large or small surfaces regardless of their weight or profile contours. It is operated and controlled by one person who himself carries the apparatus while pressing it against the edge of the surface. The apparatus includes a thermostatically controlled heater and a generous tape supply in order to do large surfaces without reloading.

The apparatus consists essentially of a plate which rides on the surface to be edge banded, using the surface itself as a guide and as a partial support for the weight of the machine. Handles on both sides of the top of the plate permit the operator to hold the machine at a convenient height in front of him. A spindle for holding the tape is located approximately in front of the operator on the top side of the plate, and the tape is guided to the underside of the plate and against the heating element by a series of rollers and tensioning guides. Several adjustments are available on the apparatus to permit adapting to various widths of tape for use on various thicknesses of surface. Immediately after the tape passes over the heating element, it is guided by a rubber roller onto the surface to which it is to be bonded. By use of the handles, the operator continuously applies lateral pressure in order to accomplish the bond at the edge. The thermosetting tape cools as it touches the surface which is to be bonded and a firm bond results. An added feature of the edge bander is a spring loaded, tape cutting device which can be triggered by the operator without removing his hands from the handles. The cutting blade is located directly following the heating element so that all that is required to terminate the edge banding is a slight rotation of the hand held machine and the tripping of the trigger with the operator's thumb.

The electrical system of the edge bander includes a standard cartridge heater inserted into an aluminum block and controlled at a fixed temperature appropriate for the bonding process by an automatic thermostat. A pilot light and thermometer are also included to aid in operation and maintenance. Since the electrical heater requires only about four amperes at 120 volts, a relatively light service cord is all that is required to furnish electrical power. This power cord and the availability of electricity are the only restrictions on mobility so that it would theoretically be possible to edge band a fence around a football stadium, and such a task would still require only one man.

DETAILED DESCRIPTION OF THE INVENTION

Figure 1:
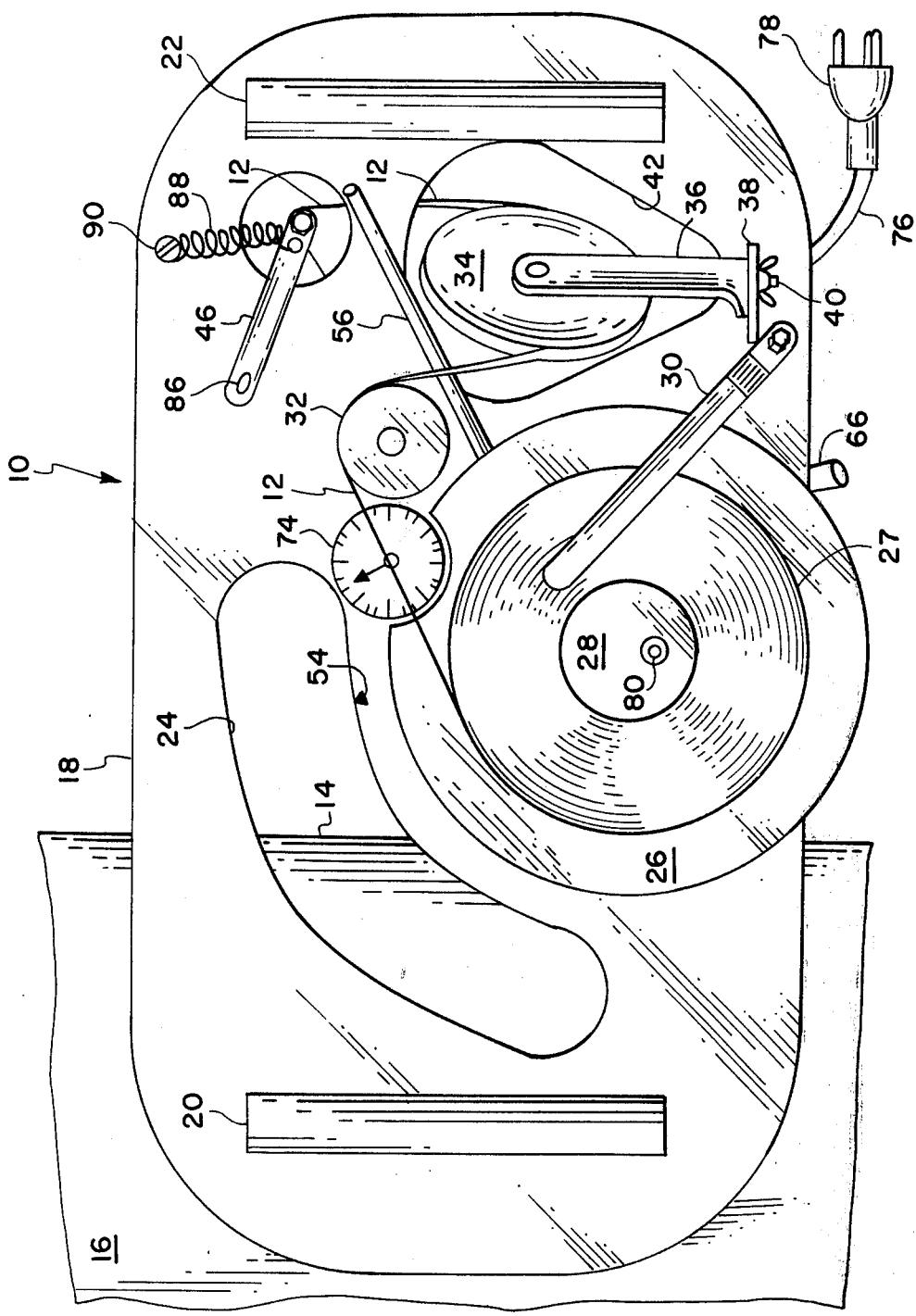
FIG. 1 is a top view of the preferred embodiment of the invention.
Figure 2:
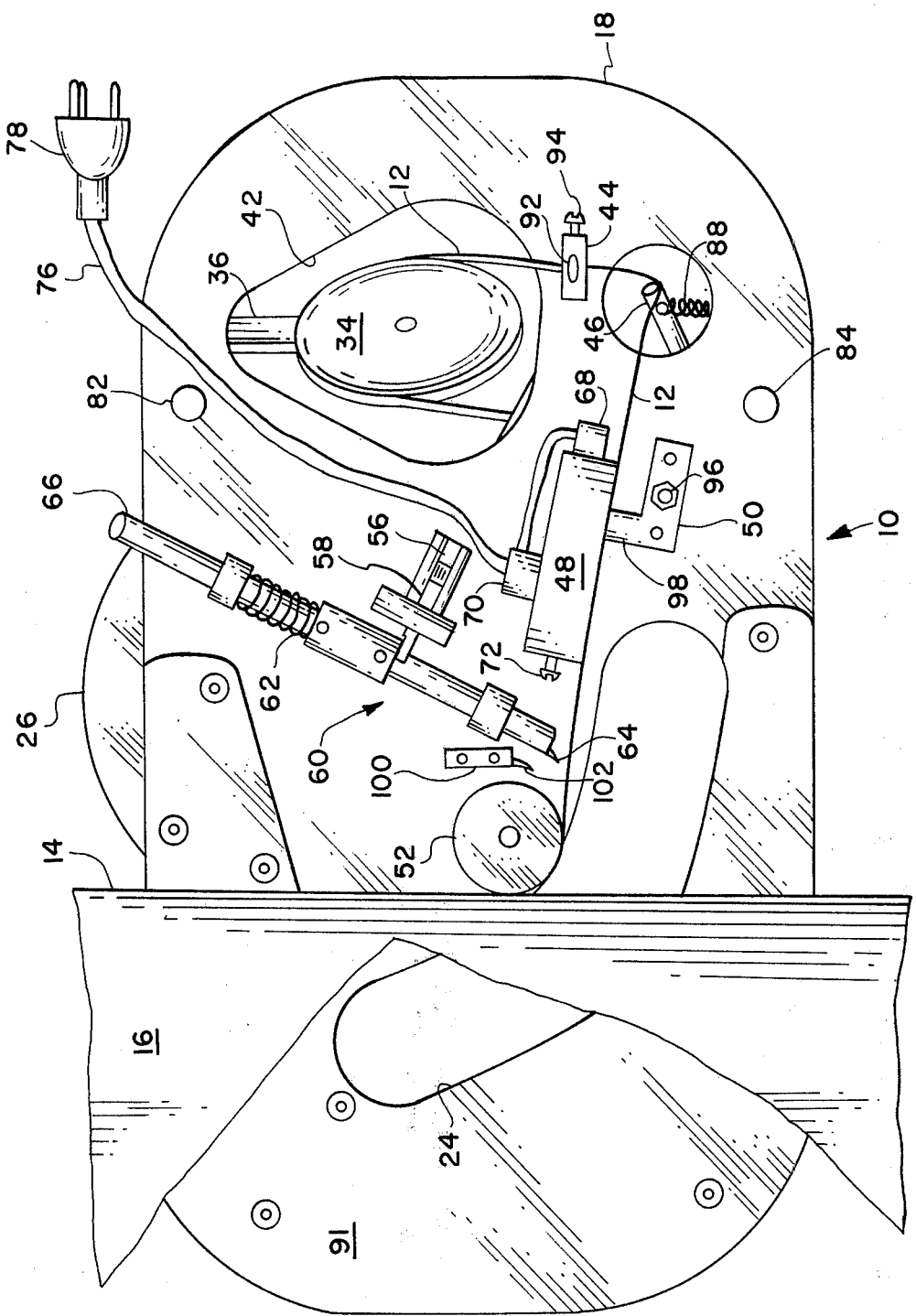
FIG. 2 is a bottom view of the preferred embodiment of the invention.

The basic concept of the invention is illustrated in FIGS. 1 and 2 where portable edge bander 10 is shown in use applying trim tape 12 to the edge 14 of surface 16. Surface 16 is shown cut away in FIG. 2 for ease of viewing. Edge bander 10 is built on mounting plate 18 upon which all the other components of the invention are mounted. As shown in FIG. 1, handles 20 and 22 are used by the operator to hold portable edge bander 10 against edge 14 which is being banded. Cut out 24 is a portion removed from the central area of plate 18 in order to better align edge bander 10 during operation. Trim tape 12 is stored on reel 27 mounted on tape reel plate 26 upon edge bander 10. Both tape reel plate 26 and tape reel 27 are centered on tape spindle 28, and reel retaining clip 30, rigidly fixed to plate 18, holds tape reel 27 on tape spindle 28. Trim tape 12 is threaded from reel 27 to guide roller 32, and then onto angular roller 34. Angular roller 34 is held by adjustable bracket 36, which is adjustably clamped onto plate 18 at bracket 38 by locking nut 40. Angular roller 34, mounted within cutout 42 in plate 18, is angularly oriented relative to the plane of plate 18 so that it transports trim tape 12 from the top of plate 18 to the underside of plate 18. On the underside of plate 18, as shown in FIG. 2, the bottom view of edge bander 10, trim tape 12 passes through adjusting guide guide block 44, around recoil leg 46, and onto heating block 48. Trim tape 12 is retained at the proper height on heating block 48 by height adjusting assembly 50 and passes along heating block 48 where it is heated to a sufficient temperature to activate the thermosetting adhesive which is on the surface of trim tape 12. Only the surface not touching heating block 48 is coated with thermosetting adhesive. Trim tape 12 passes from heating block 48 to bonding wheel 52. Bonding wheel 52, which is pressing against edge 14 due to pressure applied by the operator in a lateral direction between the handles 20 and 22, causes trim tape 12 to bond edge 14. As the heat sensitive adhesive cools on touching the edge, the bond permanently hardens.

The operation of bonding continues along the edge of the surface until, having traveled around the periphery of the surface, the initial starting point is once more approached. As the operator passes that initial starting point as viewed through contact 24, he rotates edge bander 10 counter-clockwise slightly, as viewed from his position above the plate, while retaining the pressure of bonding wheel 52 against edge 14 until marker 54 is adjacent to edge 14. At that orientation, the operator, using his right thumb, pulls lever 56 toward handle 22 (FIG. 1). That action retracts trigger 58, releasing cutting assembly 60 which is spring loaded by spring 62, thus causing blade 64 to cut trim tape 12 as it lies against edge 14. Before beginning a new operation of edge banding, the operator pulls back handle 66 in order to reset cutting assembly 60 for its next operation.

Heating block 48 is heated by standard cartridge heater 68 which is controlled by thermostat 70 so that a temperature appropriate for the particular tape being used is maintained. Thermostat control adjustment 72 is used to change the thermostat setting for different temperatures required by different tapes. Thermometer 74, shown in FIG. 1, is used by the operator to verify the proper temperature for the tape being used. Electrical power cord 76 powers heater 68 and thermostat 70 and may be connected through electrical plug 78 to any length power extension cord required to work around a particular surface. Pilot light 80, visible in FIG. 1, is used to indicate to the operator that power is applied to the edge bander. Two legs 82 and 84, as seen in FIG. 2, are available to rest the apparatus on a surface without damaging or interfering with the action of the various components on the underside of plate 18.

Recoil leg 46 functions both as a tension equalizer for trim tape 12 during its movement and also, upon cutting of the tape by cutting assembly 60 at the end of the bonding operation, recoil leg 46 pulls trim tape 12 away from heating block 48 to permit the tape to cool between bonding operations. As shown in FIG. 1, recoil leg 46 is anchored to plate 18 by a pivotal connection 86 and powdered by recoil spring 88 which is anchored to plate 18 at anchor 90.

Since alignment of trim tape 12 with edge 14 is a critical function of portable edge bander 10, various adjustments and alignment devices are used to adapt portable edge bander to different sizes of trim tape. Spacer plate 91, as seen on FIG. 2, is used to accommodate the tape alignment for the thicknesses of the bottom flange of bonding wheel 52. Adjustment of angular roller 34 is required for tape width increases in order to permit the tape to travel across the proper point on the surface of heating block 48. The height of the tape 12 on heating block 48 is further adjusted by adjusting guide block 44 in which stop 92 is adjustable vertically to control the distance of the tape from plate 18. Stop 92 is locked into position within adjusting guide block 44 by lock screw 94. The exact position of tape 12 on heating block 48 is controlled as tape 12 passes along heating block 48 by height adjusting assembly 50. Height guide 98 extends to the heating surface of heat block 48 and prevents tape 12 from running too low on heating block 48. Lock nut 96 locks height adjusting assembly 50 into a position suitable for any particular width of trim tape 12 in use for a particular job.

Bonding wheel 52 is constructed of rubber in the preferred embodiment in order to accommodate variations in pressure applied by the operator. It also is constructed with a taper of approximately one degree, with the smaller diameter being nearest plate 18, in order to assure that the tape always is positioned at the edge of bonding wheel 52 nearest plate 18.

In order to facilitate loading and starting of the tape, or the cutting out of an unsatisfactory length, stationary cutting assembly 100 is positioned between bonding wheel 52 and spring loaded cutting assembly 60. Blade 102 may then be used to cut the tape by pulling the tape against blade 102 with the fingers.

It is to be understood that the form of the invention herein shown is merely the preferred embodiment. Various changes may be made in the size, shape and the arrangement of parts; equivalent means may be substituted for those illustrated and described; and certain features may be used independently from others without departing from the spirit and scope of the invention. For example, the portable edge bander could be used without the thermometer or cutting assemblies and, in a somewhat larger configuration, with the tape storage on the underside of plate 18.

What is claimed as new and desired to the secured by Letters Patent of the U.S. is:

1. A portable apparatus for bonding thermosetting trim tape to the intersecting outside edge of a surface formed by the thickness of the surface comprising:
   mounting means including a section to rest upon a surface intersecting an outside edge to be covered by trim tape and capable of being moved along the surface and the intersecting outside edge by an individual operator while maintaining constant contact between the mounting means and the surface;
   handle means attached to the mounting means permitting an operator to grasp the apparatus and to move the apparatus along the surface and intersecting outside edge to be covered;
   tape storage means attached to the mounting means and holding a supply of the trim tape to be bonded to the edge of the surface;
   tape heating means attached to the mounting means and heated to a temperature suitable for activating an adhesive coating on the trim tape;
   bonding means attached to the mounting means so as to contact the intersecting outside edge while the mounting means rests upon the surface and positioned to permit the operator to accurately guide said bonding means along the edge to be covered while applying pressure to the edge with said bonding means; and
   tape guide means attached to the mounting means, guiding the trim tape from the tape storage means, to and into contact with the tape heating means and to the bonding means.

2. A portable apparatus for bonding thermosetting trim tape to the edge of a surface as in claim 1 wherein the tape heating means is an electrical heater which is powered by an electrical power cord which can be attached by an extension cord to standard electrical sources.

3. A portable apparatus for bonding thermosetting trim tape to the edge of a surface as in claim 1 wherein the mounting means is a plate.

4. A portable apparatus for bonding thermosetting trim tape to the edge of a surface as in claim 3 wherein the tape heating means and the bonding means are attached to the surface of the plate opposite from the surface to which the tape storage means is attached, whereby the size of the total apparatus is minimized.

5. A portable apparatus for bonding thermosetting trim tape to the edge of a surface as in claim 4 wherein the tape guide means includes an angular roller mounted within a cutout of the plate and oriented at an angle to the plane of the plate, transporting the trim tape from the tape storage means, through the plate, to the tape heating means.

6. A portable apparatus for bonding thermosetting trim tape to the edge of a surface as in claim 1 wherein the tape guide means includes adjustment and alignment means for various widths of trim tape.

7. A portable apparatus for bonding thermosetting trim tape to the edge of a surface as in claim 1 wherein the tape heating means includes means for automatically regulating the temperature of said tape heating means.

8. A portable apparatus for bonding thermosetting trim tape to the edge of a surface as in claim 1 wherein the tape heating means includes means for varying the temperature of said tape heating means to accommodate trim tapes which require different temperatures.

9. A portable apparatus for bonding thermosetting trim tape to the edge of a surface as in claim 1 further including a self-powered tape cutting means attached to the mounting means and activated by a trigger which is located in close proximity to the handle means.

10. A portable apparatus for bonding thermosetting trim tape to the edge of a surface as in claim 9 wherein the self-powered tape cutting means is powered by a spring mechanism which is manually resetable.

11. A portable apparatus for bonding thermosetting trim tape to the edge of a surface as in claim 1 further including a thermometer to verify the temperature of operation of the tape heating means.

12. A method of continuously bonding thermosetting trim tape to the intersecting outside edge of a stationary surface formed by the thickness of the surface comprising:

moving a supply of trim tape and a heater, both attached to a mounting means, along the edge of the stationary surface while;

maintaining the alignment of the trim tape with the intersecting outside edge by resting the mounting means on the stationary surface while moving it along the surface;

heating the trim tape by removing it from the tape supply and moving it across a heated surface; and pressing the trim tape against the edge to be covered, immediately after the trim tape is heated, by applying pressure to the trim tape as it touches the stationary surface edge with a surface attached to the mounting means.

13. A method of continuously bonding thermosetting tape to the edge of a stationary surface as in claim 12 further comprising cutting the trim tape with a power operated, manually triggered blade attached to the mounting means.

* * * * *